United States Patent
Saadi et al.

(10) Patent No.: US 7,861,238 B2
(45) Date of Patent: Dec. 28, 2010

(54) CONFIGURATION TOOL AND METHOD OF UPDATING AN ARCHIVE FILE PROPERTY RELATING TO AT LEAST ONE POINT-OF-SALE PERIPHERAL

(75) Inventors: Brian Al Saadi, Richmond Hill (CA); Michael Mannion, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 1049 days.

(21) Appl. No.: 11/610,331

(22) Filed: Dec. 13, 2006

(65) Prior Publication Data
US 2007/0169097 A1    Jul. 19, 2007

Related U.S. Application Data

(60) Provisional application No. 60/751,742, filed on Dec. 19, 2005.

(51) Int. Cl.
G06F 9/44    (2006.01)
G06F 9/00    (2006.01)

(52) U.S. Cl. .................. 717/168; 719/327; 713/100
(58) Field of Classification Search ............... 717/168; 719/327; 713/100
See application file for complete search history.

(56) References Cited

U.S. PATENT DOCUMENTS

| | | | |
|---|---|---|---|
| 5,974,135 A * | 10/1999 | Breneman et al. | 379/265.04 |
| 6,571,389 B1 | 5/2003 | Spyker et al. | |
| 6,601,095 B1 * | 7/2003 | Duffield et al. | 709/222 |
| 6,704,864 B1 * | 3/2004 | Philyaw | 713/1 |
| 2003/0154284 A1 * | 8/2003 | Bernardin et al. | 709/226 |
| 2003/0225795 A1 | 12/2003 | Abdallah et al. | |
| 2004/0123285 A1 | 6/2004 | Berg et al. | |
| 2005/0021688 A1 | 1/2005 | Felts et al. | |
| 2005/0234987 A1 | 10/2005 | Cyphers | |
| 2005/0240902 A1 | 10/2005 | Bunker et al. | |
| 2005/0257226 A1 * | 11/2005 | Belvin et al. | 719/328 |
| 2005/0278280 A1 | 12/2005 | Semerdzhiev et al. | |
| 2006/0004725 A1 | 1/2006 | Abraido-Fandino | |
| 2006/0101462 A1 * | 5/2006 | Spears | 717/177 |
| 2006/0143572 A1 * | 6/2006 | Scott et al. | 715/765 |
| 2006/0173857 A1 * | 8/2006 | Jackson | 707/10 |
| 2006/0173984 A1 * | 8/2006 | Emeis et al. | 709/223 |
| 2006/0294209 A1 * | 12/2006 | Rosenbloom et al. | 709/220 |
| 2007/0061796 A1 * | 3/2007 | Atsatt | 717/166 |

OTHER PUBLICATIONS

"JAVA POS v1.9 App Guide", pp. 1-2, Sep. 3, 2005, "http://web.archive.org/web/20050903102314/http://www.javapos.com/public.app.guide.9.html".*

* cited by examiner

*Primary Examiner*—Wei Y Zhen
*Assistant Examiner*—Chih-Ching Chow
(74) *Attorney, Agent, or Firm*—Mark P. Watson

(57) ABSTRACT

A configuration tool and method of updating a pointer entry in a Java archive (JAR) file pointing to a peripheral configuration file comprises generally continuously listening for an event signifying deployment of a peripheral configuration file and in response to the event, automatically updating the pointer entry in the JAR file that points to the deployed peripheral configuration file.

4 Claims, 5 Drawing Sheets

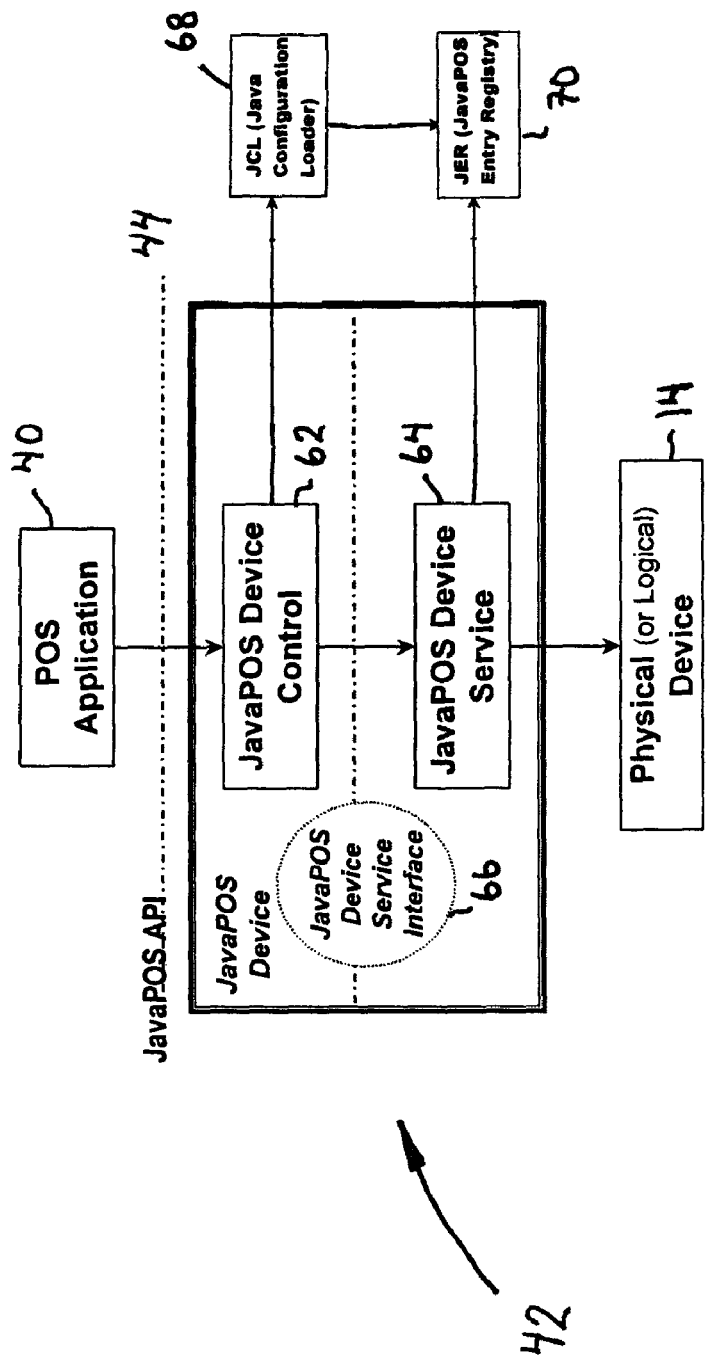

CONFIGURATION TOOL AND METHOD OF UPDATING AN ARCHIVE FILE PROPERTY RELATING TO AT LEAST ONE POINT-OF-SALE PERIPHERAL

FIELD OF THE INVENTION

The present invention relates generally to point-of-sale peripherals and in particular, to a configuration tool and method of updating an archive file property relating to at least one point-of-sale peripheral.

BACKGROUND OF THE INVENTION

Stand-alone electronic cash registers including payment card readers and receipt printers have been used for years in stores, retail outlets and service outlets to facilitate the completion of cash, cheque, credit card or debit card transactions for the purchase of goods and/or services. With the advent of sophisticated and inexpensive computing equipment, input devices and secure communication networks, point-of-sale (POS) stations have, for the most part, replaced such stand-alone electronic cash registers.

POS stations typically include a host device and a plurality of peripherals connected to the host device. The host device is commonly in the form of a personal computer that executes a POS application. The peripherals often include a keyboard, a display screen, a cash drawer, a printing device, a payment card reader and a barcode reader. In some cases, a touch-sensitive display screen is used instead of separate keyboard and display screen peripherals. The POS application communicates with the peripherals via application program interfaces (APIs) to allow product and/or service transactions to be completed.

When payment is effected using a debit or credit card, the host device establishes a connection to the appropriate financial institution over an information network so that approval for the transaction may be obtained. Upon completion of any transaction, the host device signals the printing device causing the printing device to generate a transaction receipt and possibly a signing receipt, if payment is made using a credit card.

In larger stores, retail outlets and service outlets, POS stations are typically linked via a local area network and communicate with a backend computing device that maintains a database for transaction, inventory, accounting, sales, tax, etc. information. Transaction data received by each of the POS stations is conveyed to the backend computing device for storage in the database allowing all transaction data to be stored in a common location. Collectively storing all transaction data in one common location allows retailers to track, account for and maintain inventory, collected taxes and pricing information. Also, by linking the POS stations, updates relating to sales on products and/or services, tax, etc. can be communicated to each POS station over the local area network avoiding the need to update the POS stations one at a time.

Two initiatives to standardize the development of POS stations based on the UnifiedPOS standard have been developed, namely object linking and embedding POS ("OPOS") and Java for Retail POS ("JavaPOS"). Java and all Java-based marks are a trademark or registered trademark of Oracle Corporation. These standards have enabled peripherals to be readily interchanged and easily integrated into POS stations allowing POS stations to be configured to meet changing needs. This of course has been a leading factor to POS station acceptance.

In JavaPOS environments, information relating to the configuration of peripherals is stored in one or more files, typically in XML format, that is separate from POS application run by the host device. Each configuration XML file contains information for all peripherals connected in a given configuration. The configuration XML file associated with the desired configuration is selected for use. To link the POS application and the configuration XML files, the POS application comprises a compressed Java archive (JAR) file that embodies a properties file storing pointers to the configuration XML files.

When a configuration XML file is deployed, i.e the selected configuration XML file is saved to a new location or a new configuration XML file that is to be used is saved, in order to update the pointer associated with the deployed configuration XML file, it has been necessary for a user to extract manually the compressed JAR file, locate and access the properties file therein and then update the appropriate pointer entry so that the pointer entry correctly points to the deployed configuration XML file. As will be appreciated, updating the pointer entry in this manner is cumbersome and time consuming.

Methods for enhancing the use of Java archive files and Java implemented applications, and improving file management are well documented in the art. For example, U.S. Pat. No. 6,571,389 to Spyker et al. discloses a method, system, and computer-readable code for improving the manageability and usability of a Java environment. A technique that combines the advantages of applets and applications while avoiding particular disadvantages of both is employed whereby all Java programs are executed without relying on the use of a browser to provide a run-time environment. Dependencies are specified in a manner that enables the Java programs to be dynamically located and installed, and in a manner that enables sharing dependent modules (including run-time environments) among applications. The dependency specification technique ensures that all dependent code will be automatically available at run-time, without requiring a user to perform manual installation. The run-time environment required for an application is specified, and a technique is provided for dynamically changing the run-time that will be used (including the ability to change run-times on a per-program basis), without requiring user intervention.

U.S. Patent Application Publication No. 2003/0225795 to Abdallah et al. discloses a mechanism for extending a Java archive file to include additional information that describes the contents of the archive file as update information. The mechanism comprises a program for determining differences between an initial file system tree and a final file system tree and for encoding the differences into entries in a Java archive file. An extractor class is included in the Java archive file and named as the main class. The Java archive file may be transported to a site that needs a file system update. The Java archive file may be executed in a Java runtime environment to update a target file system. The extractor class is executed to decode and effectuate the difference entries in the Java archive file.

U.S. Patent Application Publication No. 2004/0123285 to Berg et al. discloses application configurations, including applications themselves, application components, and modules associated with applications, which are installed on an application-server machine and stored in system-determined locations. The system-determined locations, or absolute paths, are then stored in a "loose configuration". As new versions of applications, application components, and/or modules are installed, they are placed in unique locations and given unique version numbers. Records of each application configuration version are stored and are referred to as "snapshots". These snapshots provide a record of, and pointers to, the various elements that make up the various application configuration versions, so that at any time, a current version of an application configuration can be "rolled back" to a previous version of an application configuration. The methodology can be utilized to provide a self-healing configuration, whereby a faulty version of an application configuration can be rolled back to a previous version automatically.

U.S. Patent Application Publication No. 2005/0021688 to Felts et al. discloses a system and method of configuring a domain. The method comprises providing a first user interface operable to configure the domain and a second user interface operable to configure a cluster. Configuration of the domain is based on a domain template.

U.S. Patent Application Publication No. 2005/0234987 to Cyphers discloses a method for updating values within the contents of a Java archive (JAR) file without altering the JAR file structure. A smart archive program (SAP) creates a temporary directory in memory and stores the JAR file structure in the memory. The SAP then extracts the JAR file content into the temporary directory and allows the user to update the field values within the JAR file content. When the user has finished updating the field values in the JAR file content, the SAP archives the JAR file content into a new JAR file according to the JAR file structure stored in the memory. Consequently, field values within the JAR file content can be updated without altering the JAR file structure.

U.S. Patent Application Publication No. 2005/0240902 to Bunker et al. discloses a system and method for an extendable application framework, comprising a user interface, at least one service, and at least one extension. At least one of the extensions provides access to functionality in the user interface and at least one of the services provides access to functionality in at least one of the extensions.

U.S. Patent Application Publication No. 2005/0278280 to Semerdzhiev et al. discloses a system for updating files in a computer system. The update system downloads files from a centralized database during a start up process. The start up process completes loading of all services and applications to be provided by the computer system and then initiates an update process. During the update process, open archive files are closed and may be replaced by downloaded files. File replacement is handled by an updated module without requiring the generation of scripts or code to be executed during a subsequent start up process in order to complete the update.

As will be appreciated, although the above references disclose Java management techniques, there exists a need for an improved method of dealing with POS peripheral configuration updates. It is therefore an object of the present invention to provide a novel configuration tool and method of updating an archive file property relating to at least one point-of-sale (POS) peripheral.

SUMMARY OF THE INVENTION

Accordingly, in one aspect there is provided a method of updating an archive file property pointing to a configuration file, said method comprising:

detecting when a configuration file has been deployed; and automatically updating a pointer entry in the archive file that is associated with said deployed configuration file.

In one embodiment, the automatic pointer updating is performed in response to a configuration file save method call. The detecting comprises generally continuously listening for the configuration file save method call and in response thereto, performing automatically, the pointer entry updating. During the pointer entry updating, a replacement Java archive (JAR) file with the updated pointer entry is created and used to overwrite an existing JAR file.

If desired, prior to the automatic pointer entry updating, an address value of the pointer entry can be compared with the address value of the deployed configuration file. The automatic pointer entry updating is bypassed if the address values are the same. Also, after the comparing, a user may be prompted to confirm that the automatic pointer entry updating is to proceed.

According to another aspect there is provided a method of updating a pointer entry in a Java archive (JAR) file pointing to a peripheral configuration file comprising:

generally continuously listening for an event signifying deployment of a peripheral configuration file; and in response to said event, automatically updating the pointer entry in said JAR file pointing to the deployed peripheral configuration file.

According to yet another aspect there is provided a point-of-sale (POS) station comprising:

a host device executing a POS application comprising an archive file including a properties file storing at least one pointer entry pointing to an associated peripheral configuration file;

at least one peripheral communicating with said POS application via a POS device and an associated application program interface; and a listener application detecting deployment of a peripheral configuration file and automatically updating the pointer entry in said properties file pointing to said deployed peripheral configuration file.

In one embodiment, the POS station comprises a plurality of peripherals. The associated peripheral configuration file stores information for all of the peripherals for a given configuration. The listener application is responsive to a peripheral configuration file save method call and creates a replacement Java archive (JAR) file with the updated pointer entry and overwrites the existing JAR file with the replacement JAR file.

According to yet another aspect there is provided a computer readable medium embodying a computer program for updating an archive file property pointing to a configuration file, said computer program comprising:

computer program code for detecting when a configuration file has been deployed; and computer program code for automatically updating a pointer entry in the archive file that is associated with said deployed configuration file.

According to yet another aspect there is provided a computer readable medium embodying a computer program for updating a pointer entry in a Java archive (JAR) file pointing to a peripheral configuration file comprising:

computer program code for generally continuously listening for an even signifying deployment of a peripheral configuration file; and computer program code for, in response to said event, automatically updating the pointer entry in said JAR file pointing to the deployed peripheral configuration file.

According to still yet another aspect there is provided a configuration tool for automatically updating a configuration file pointer entry in a Java archive (JAR) file comprising:

means for generally continuously listening for an event signifying deployment of a peripheral configuration file associated with said pointer entry; and means responsive to said event for automatically updating the pointer entry so that said pointer entry points to said deployed peripheral configuration file.

BRIEF DESCRIPTION OF THE DRAWINGS

Embodiments will now be described more fully with reference to the accompanying drawings in which:

FIG. 3 is a block diagram showing the JavaPOS device architecture; and

DETAILED DESCRIPTION OF THE EMBODIMENTS

Figure 1:
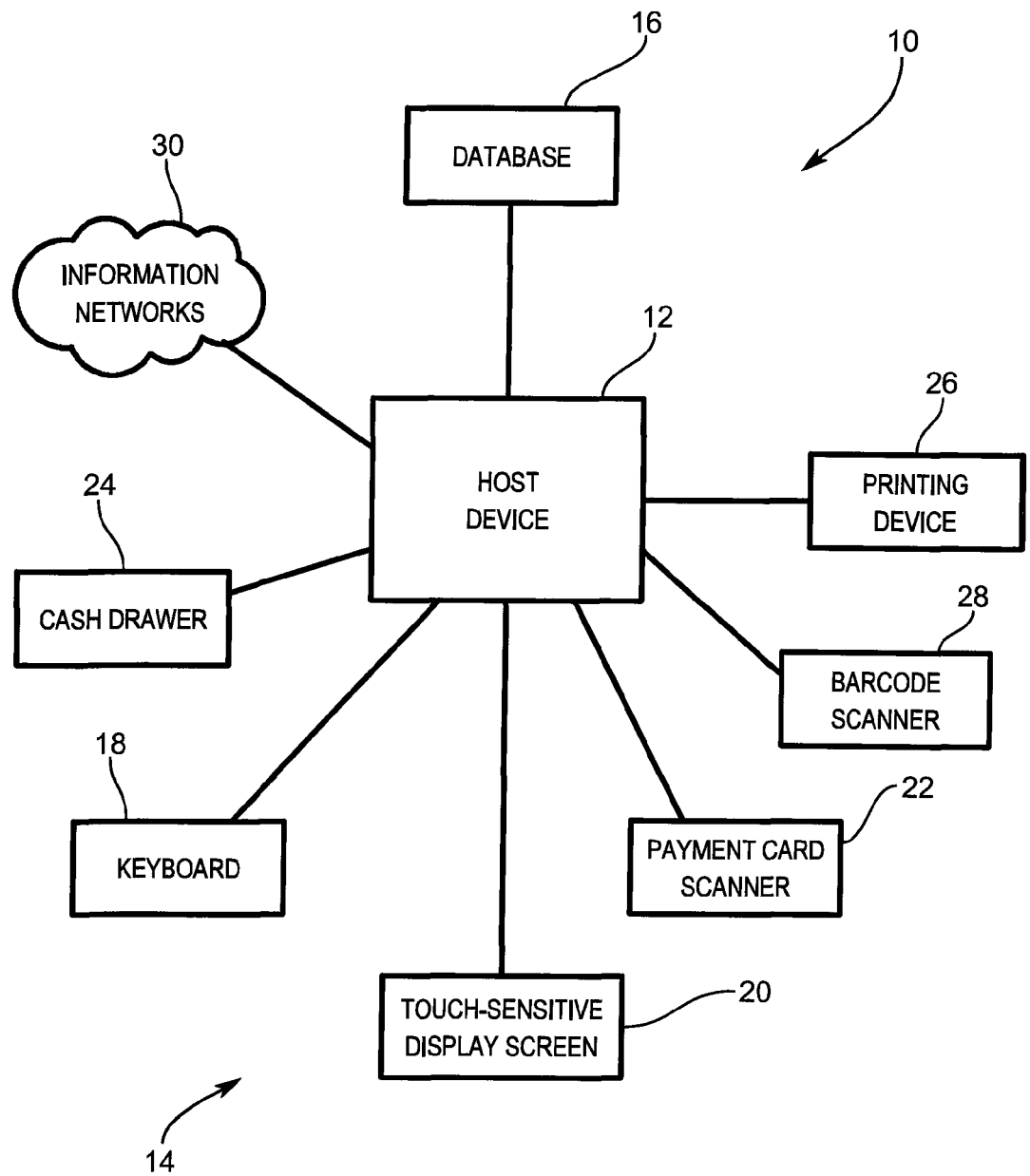
FIG. 1 is a schematic diagram of a point-of sale (POS) station.

Turning now to FIG. 1, a point-of-sale (POS) station is shown and is generally identified by reference numeral 10. As can be seen, POS station 10 includes a microprocessor-based host device 12 in the form of a personal computer that communicates with a plurality of physical devices or peripherals generally identified by reference numeral 14 and with a database 16 storing transaction, inventory, pricing, tax and accounting information. In this example, peripherals 14 include a keyboard 18, a touch-sensitive display screen 20, a payment card scanner 22, a cash drawer 24, a printing device 26 and a barcode scanner 28. Host device 12 also communicates with financial institutions (not shown) such as banks and credit card companies over one or more information networks generally identified by reference numeral 30.

Figure 2:
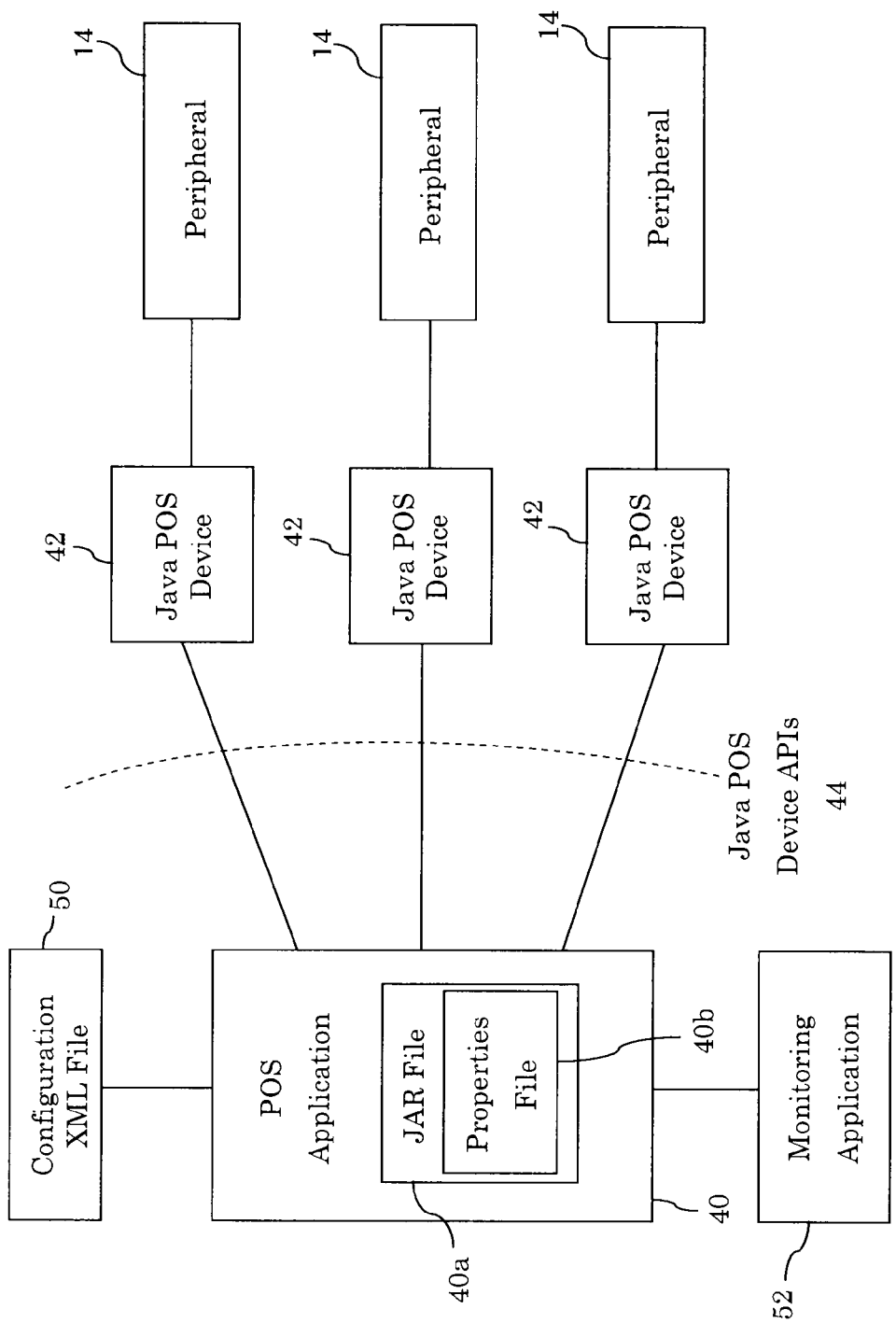
FIG. 2 is a block diagram of the POS station architecture.

In this embodiment, the POS station 10 employs Java for Retail POS (JavaPOS). The JavaPOS architecture is generally shown in FIG. 2. As can be seen, the host device 12 runs a POS application 40 that interacts with the peripherals 14 through JavaPOS devices 42 and associated JavaPOS device APIs 44. The POS application 40 manipulates the peripherals 14 by calling the JavaPOS device APIs 44 associated with the JavaPOS devices 42 of the peripherals 14 to be manipulated. In this manner, the POS station 10 can operate in a known manner to enable product and/or service transactions to be completed.

The POS application 40 also communicates with a configuration file 50 in the XML format. The configuration XML file 50 is stored in memory separate from the POS application 40 and contains information for all peripherals in a given configuration. If desired, more than one configuration XML file 50 may be included. If more than one configuration XML file 50 exists, only one configuration XML file is in use at a given time.

The POS application 40 comprises a compressed common Java archive (JAR) file 40a that embodies a common properties file 40b storing a pointer entry to the configuration XML file 50 together with the JavaPOS source. A configuration tool comprising a monitoring application 52 run by the host device 12 monitors the POS station 10 to detect events signifying deployment of a configuration XML file 50. In this embodiment, the monitoring application 52 listens to detect configuration XML file move and save events made using the XercesRegPopulator save method. When a configuration XML file 50 has been deployed, the monitoring application 52 automatically updates the pointer entry in the properties file associated with deployed configuration XML file 50 as will be described.

Turning now to FIG. 3, the architecture of one of the JavaPOS devices 42 is better illustrated. As can be seen, the JavaPOS device 42 comprises a JavaPOS device control 62 and a JavaPOS device service 64 communicating with one another through a JavaPOS device service interface 66. The JavaPOS device control 62 and JavaPOS device service 64 also communicate with a JavaPOS configuration and loader API 68 and a JavaPOS entry registry 70. The JavaPOS configuration and loader API 68 and JavaPOS entry registry 70 enable the JavaPOS device control 62 to bind to the correct JavaPOS device service 64. The JavaPOS device 42 as described above communicates with the POS application 40 through an associated JavaPOS device API 44.

The JavaPOS device controls 62 are divided into categories with each category representing a peripheral device function. The JavaPOS device controls 62 provide the interface between the POS application 40 and their associated peripheral device functions. The JavaPOS device service 64 is a Java class called by the JavaPOS control devices 62 through the JavaPOS device service interfaces 66. The JavaPOS device services 64 are used by the JavaPOS device controls 62 to implement peripheral functionality.

The JavaPOS device controls 62 are responsible for managing connection to and interaction with JavaPOS device services 64, forwarding property access and method calls to JavaPOS device services 64 and throwing exceptions when property accesses and method calls fail, supporting add/remove event listener instructions and generating events to registered listeners in response to JavaPOS device service commands.

The JavaPOS device services 64 are responsible for supporting the JavaPOS device service interface 66, implementing property access and method calls and throwing exceptions when property accesses and method calls fail, enqueing events and delivering events through calls to the JavaPOS device controls 62 when preconditions for delivering the events are satisfied and managing access to the associated peripheral 14. Further specifics concerning the JavaPOS and JavaPOS device architectures and operation are described in Appendix B of the UnifiedPOS Retail Peripheral Architecture—Version 1.10, the content of which is incorporated herein by reference.

Figure 4A:
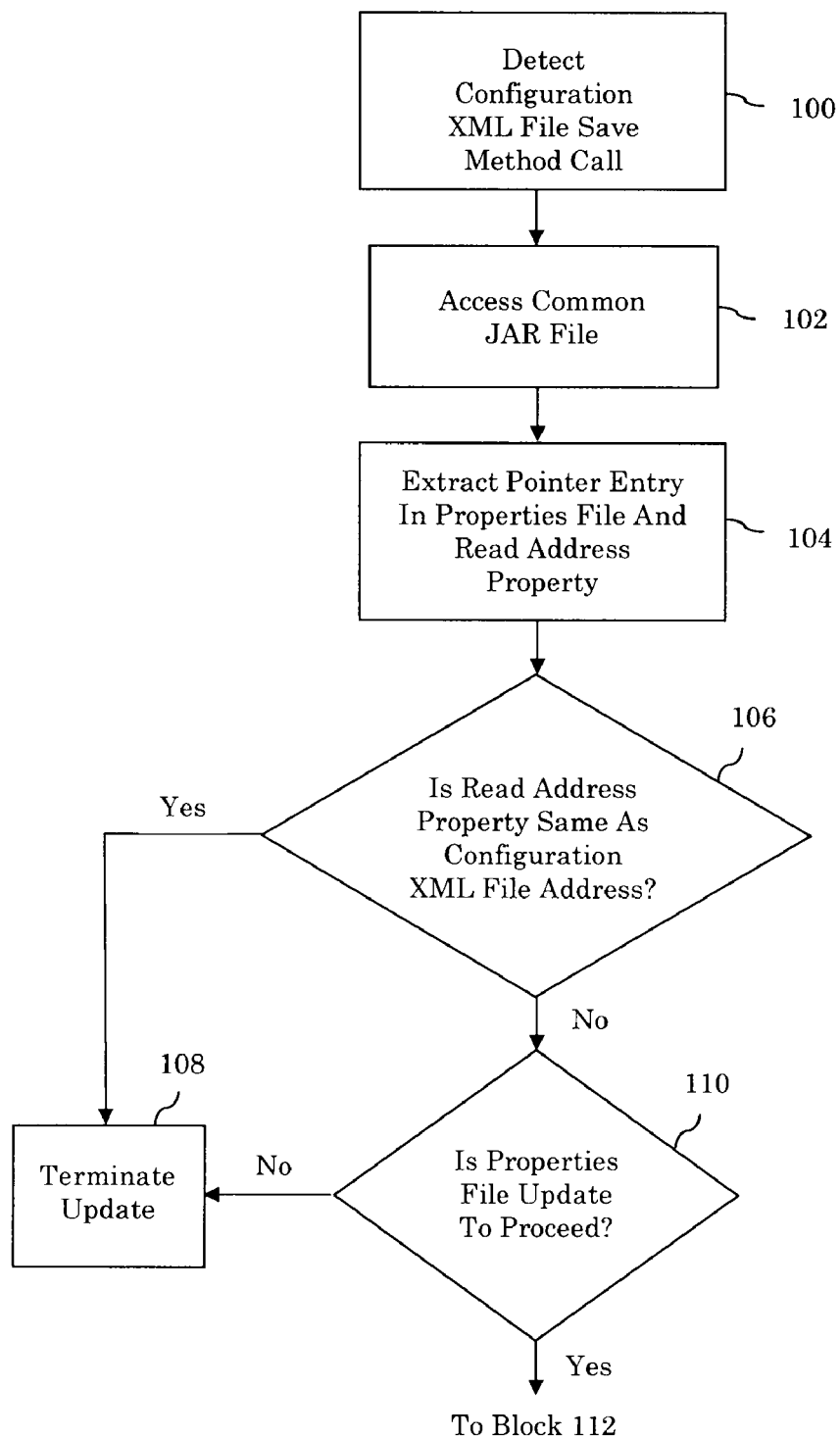
FIGS. 4a and 4b are flowcharts showing the steps performed during updating of an archive file property relating to a POS peripheral.
Figure 4B:
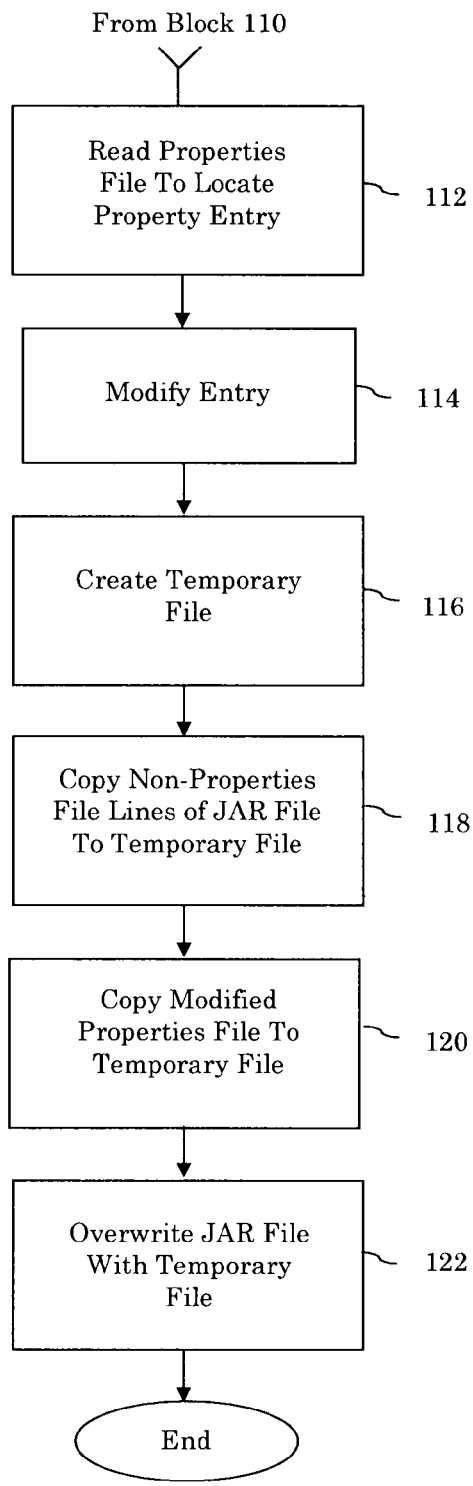

The method by which the common properties file 40b in the common JAR file 40a is automatically updated by the monitoring application 52 in response to deployment of a configuration XML file 50 will now be described with particular reference to FIGS. 4a and 4b. When a configuration XML file 50 is deployed using the XercesRegPopulator save method contained in the common JAR file 40a, the deployment of the configuration XML file 50 is detected by the monitoring application 52, which specifically listens for this save method call (step 100). In response to the detected save method call, the monitoring application 52 uses the JavaLibraries to access the common JAR file 40a via the java.util.JarFile class (step 102). Once accessed, the pointer entry in the common properties file 40b associated with the deployed configuration XML file 50 is then extracted and sent to a java.util.Properties class where its jpos.config.populator (i.e. address) property is read (step 104). The value of the read address property is then compared to the location at which the deployed configuration XML file 50 has been saved (step 106). If the value of the read address property and the location of the deployed configuration XML file are the same, signifying that the deployed configuration XML file 50 has been saved to the same location and thus, the pointer entry remains accurate, the properties file update procedure is terminated (step 108).

At step 106, if the value of the read address property and the location of the deployed configuration XML file are not the same, signifying that the deployed configuration XML file 50 has been saved to a new location, a dialog box is displayed requesting the user either to confirm that the properties file update is to proceed or to indicate that the properties file update should not occur (step 110). If the user indicates that the properties file update should not occur, the properties file update is terminated (step 108). The user is given the option to terminate the properties file update procedure, as updating pointer entry results in changes to the JAR file 40a, which is common to the entire POS station 10. If the user confirms that the properties file update is to proceed, the common properties file 40b is read line by line until the line containing the jpos.config.populatorFile property entry associated with the deployed configuration XML file 50 is located (step 112). Once located, the line that contains the jpos.config.populatorFile property entry is modified to include a property corresponding to the deployed configuration XML file address (step 114).

The common properties file 40b is often encoded using a non-standard encoding scheme. Table 1 below shows the mapping between special characters and their encoding.

TABLE 1

| Special Character | Unicode Value | Encoding |
|---|---|---|
| Horizontal tab | 0x0009 | ¥t |
| New-line | 0x000a | ¥n |
| Form feed | 0x000c | ¥f |
| Carriage return | 0x000d | ¥r |
| ! | 0x0021 | ¥! |
| # | 0x0023 | ¥# |
| : | 0x003a | ¥: |
| = | 0x003d | ¥= |
| ¥ | 0x005c | ¥¥ |

In addition, Unicode characters having a value less than 0x0020 or greater than 0x007f are encoded in the format ¥uXXXX where XXXX is the value of the Unicode character in hexadecimal prefixed with any zero (0) characters required to ensure four (4) characters are used. The monitoring application 52 makes use of Table 1 and the above referenced Unicode encoding in order to read properly the lines of the common properties files 40b.

After the common properties file 40b has been updated at step 114, the monitoring application 52 creates a temporary file that is opened as a java.utiljar.JarOutputStream object (step 116). For every line of the common JAR file 40a that is not the common properties file 40b, a straight binary copy of the line is made to the temporary file (step 118). Once these lines of the common JAR file 40a have been copied to the temporary file, the modified common properties file 40b is saved to the temporary file (step 120). The temporary file is therefore basically a copy of the common JAR file 40a except that it includes an updated common properties file. The monitoring application 52 then makes a straight binary copy of the temporary file to overwrite the common JAR file 40a (step 122). As a result, the common properties file 40b of the common JAR file 40a is automatically updated in response to the configuration XML file deployment.

Although the above properties file updating method involves comparing address values and prompting the user to confirm that the properties file updating is to proceed, one or both of these steps can be omitted, if desired. If the step of prompting the user is included, the dialog box may include a "Do Not Remind Me Again" selection box to allow the user to bypass this step after the first occurrence. As is well known, when the selection box is selected, the user's choice is stored in memory and used during future properties file updates.

The monitoring application may comprise program modules including routines, programs, object components, data structures etc. and be embodied as computer-readable program code stored on a computer-readable medium. The computer-readable medium is any data storage device that can store data, which can thereafter be read by a computer system. Examples of computer-readable medium include for example read-only memory, flash memory, random-access memory, hard disk drives, magnetic tape, CD-ROMs and other optical data storage devices. The computer-readable program code can also be distributed over a network including coupled computer systems so that the computer-readable program code is stored and executed in a distributed fashion.

Although embodiments have been described, those of skill in the art will appreciate that variations and modifications may be made without departing from the spirit and scope thereof as defined by the appended claims.

What is claimed is:

1. A method of updating a Java archive (JAR) file property pointing to a peripheral configuration file, said method comprising:

detecting when a peripheral configuration file has been deployed; and automatically updating a pointer entry in the JAR file that is associated with said deployed peripheral configuration file;

wherein said automatic pointer entry updating is performed in response to a configuration file XercesRegPopulator save method call contained in the JAR file;

wherein said detecting comprises generally continuously listening for said configuration file XercesRegPopulator save method call and in response thereto, performing automatically, said pointer entry updating;

wherein during said pointer entry updating, a replacement JAR file with said updated pointer entry is created and used to overwrite the existing JAR file;

prior to said automatic pointer entry updating, comparing an address value of said pointer entry with the location at which said deployed peripheral configuration file has been saved; and bypassing said automatic pointer entry updating if said address values are the same;

after said comparing, prompting a user to confirm that said automatic pointer entry updating is to proceed, if said address values are not the same; and storing the result of said prompting and using the stored result during future JAR file property updates.

2. A method of updating a pointer entry in a Java archive (JAR) file pointing to a peripheral configuration file comprising:

generally continuously listening for an event signifying deployment of a peripheral configuration file; and in response to said event, automatically updating the pointer entry in said JAR file pointing to the deployed peripheral configuration file;

wherein said automatic pointer entry updating is performed in response to a configuration file XercesRegPopulator save method call contained in the JAR file;

wherein said detecting comprises generally continuously listening for said configuration file XercesRegPopulator save method call and in response thereto, performing automatically, said pointer entry updating;

wherein during said pointer entry updating, a replacement JAR file with said updated pointer entry is created and used to overwrite the existing JAR file;

prior to said automatic pointer entry updating, comparing an address value of said pointer entry with the location at which said deployed peripheral configuration file has been saved; and bypassing said automatic pointer entry updating if said address values are the same;

after said comparing, prompting a user to confirm that said automatic pointer entry updating is to proceed, if said address values are not the same; and storing the result of said prompting and using the stored result during future JAR file property updates.

3. A point-of sale (POS) station comprising:

a host device executing a POS application comprising a Java archive (JAR) file including a properties file storing at least one pointer entry pointing to an associated peripheral configuration file;

at least one peripheral communicating with said POS application via a POS device and an associated application program interface; and a listener application detecting deployment of a peripheral configuration file and automatically updating the pointer entry in said properties file pointing to said deployed peripheral configuration file;

wherein said automatic pointer entry updating is performed in response to a configuration file XercesRegPopulator save method call contained in the JAR file;

wherein said detecting comprises generally continuously listening for said configuration file XercesRegPopulator save method call and in response thereto, performing automatically, said pointer entry updating;

wherein during said pointer entry updating, a replacement JAR file with said updated pointer entry is created and used to overwrite the existing JAR file; and wherein said listener application prior to said automatic pointer entry updating, compares an address value of said pointer entry with the location at which said deployed peripheral configuration file has been saved; and bypasses said automatic pointer entry updating if said address values are the same;

after said comparing, prompts a user to confirm that said automatic pointer entry updating is to proceed, if said address values are not the same; and stores the result of said prompting and uses the stored result during future archive file property updates.

4. A POS station according to claim 3 comprising a plurality of peripherals, said associated peripheral configuration file storing information for all of said peripherals in a given configuration.

* * * * *